United States Patent
Nagata et al.

(10) Patent No.: US 11,095,660 B2
(45) Date of Patent: Aug. 17, 2021

(54) BLOCKCHAIN ENABLED ENCRYPTION

(71) Applicant: Toyota Motor Engineering & Manufacturing North America, Inc., Plano, TX (US)

(72) Inventors: Katsumi Nagata, Foster City, CA (US); Divya Sai Toopran, Sunnyvale, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 326 days.

(21) Appl. No.: 16/262,622

(22) Filed: Jan. 30, 2019

(65) Prior Publication Data

US 2020/0244671 A1     Jul. 30, 2020

(51) Int. Cl.
*H04L 29/06*     (2006.01)
*G06F 15/16*     (2006.01)
*G06F 7/04*      (2006.01)
*H04L 9/06*      (2006.01)
*H04L 9/08*      (2006.01)

(52) U.S. Cl.
CPC .......... *H04L 63/107* (2013.01); *H04L 9/0618* (2013.01); *H04L 9/0822* (2013.01); *H04L 63/0876* (2013.01); *H04L 63/12* (2013.01); *H04L 2209/38* (2013.01)

(58) Field of Classification Search
CPC ... H04L 63/107; H04L 9/0618; H04L 9/0822; H04L 63/0876; H04L 63/12; H04L 2209/38
USPC ........................................................... 726/4
See application file for complete search history.

(56) References Cited

U.S. PATENT DOCUMENTS

| | | | |
|---|---|---|---|
| 9,569,771 B2 * | 2/2017 | Lesavich | H04L 67/1097 |
| 9,736,170 B2 * | 8/2017 | Rommele | H04L 63/12 |
| 9,774,578 B1 | 9/2017 | Ateniese et al. | |
| 9,774,579 B2 * | 9/2017 | Oberheide | H04L 9/14 |
| 10,163,080 B2 * | 12/2018 | Chow | G06Q 50/18 |
| 2014/0128001 A1 | 5/2014 | Imes et al. | |

(Continued)

OTHER PUBLICATIONS

Rens W. van der Heijden; Blackchain: Scalability for Resource-Constrained Accountable Vehicle-to-X Communication; 2017; p. 1-5.*

(Continued)

*Primary Examiner* — Monjur Rahim
(74) *Attorney, Agent, or Firm* — Snell & Wilmer L.L.P.

(57) ABSTRACT

Methods, systems, and devices of an encryption key distribution system. The encryption key distribution system includes a first computing device, a second computing device and a third computing device. The first computing device includes a memory configured to store a first distributed ledger. The first computing device includes an electronic control unit. The electronic control unit is configured to provide the first distributed ledger to the second computing device when the distance is less than a threshold distance. The electronic control unit is configured to receive a second distributed ledger from the second computing device. The electronic control unit is configured to verify the second computing device using the second distributed ledger. The electronic control unit is configured to receive an encryption key from the third computing device after the second computing device has been verified.

19 Claims, 6 Drawing Sheets

(56) References Cited

U.S. PATENT DOCUMENTS

| | | | |
|---|---|---|---|
| 2015/0271185 A1* | 9/2015 | Rommele | H04L 9/3247 |
| | | | 713/176 |
| 2018/0144114 A1 | 5/2018 | Fiske | |
| 2018/0253464 A1 | 9/2018 | Kohli et al. | |
| 2018/0342036 A1 | 11/2018 | Zachary | |
| 2018/0357438 A1 | 12/2018 | Gayton et al. | |

OTHER PUBLICATIONS

Leiding et al. "Enabling the Vehicle Economy Using a Blockchain-Based Value Transaction Layer Protocol for Vehicular Ad-Hoc Networks"; *The 12$^{th}$ Mediterranean Conference on Information Systems*; 16 pages; 2018.

Michelin et al. "SpeedyChain: A framework for Decoupling Data from Blockchain for Smart Cities"; arXiv: 1807.01980 [cs.CR]; 10 pages; Jul. 5, 2018.

Yang et al. "Blockchain-based Decentralized Trust Management in Vehicular Networks"; *IEEE Internet of Things Journal*; 10 pages; 2018.

Rowan et al. "Securing Vehicle to Vehicle Communications Using Blockchain through Visible Light and Acoustic Side-Channels"; arXiv:1704.02553v1 [cs.CR]; 10 pages; Apr. 9, 2017.

Liu et al. "Blockchain-Enabled Security in Electric Vehicles Cloud and Edge Computing"; *IEEE Network*; pp. 78-83; May/Jun. 2018.

Xu et al. "A Remote Attestation Security Model Based on Privacy-Preserving Blockchain"; *IEEE Access*; vol. 6; pp. 67809-97818; 2018.

\* cited by examiner

BLOCKCHAIN ENABLED ENCRYPTION

BACKGROUND

1. Field

The present disclosure relates to systems, apparatuses, devices and methods for distributing encryption keys and authenticating communication among vehicles, traffic infrastructure and/or other systems and/or devices.

2. Description of the Related Art

Typical vehicle-to-vehicle (V2V), vehicle-to-infrastructure (V2I) or other V2X systems use Bluetooth Low Energy (BLE) to communicate with devices within a close proximity of the vehicle. Current BLE implementations without pairing or handshaking are unsecure. Moreover, no pairing and no handshaking is required for universal adaptation of secure BLE communications between a vehicle and other devices, such as Internet-of-Things (IoT) devices, infrastructures or other vehicles. Consequently, other parties may unintentionally or intentionally access communication between the vehicle or other device without proper access and/or may spoof the identity of the vehicle or other device without proper credentials. Thus, in order to prevent unauthorized access to the communication between the vehicle, infrastructure and other vehicle or device, the communication between the vehicle, the other vehicle or other device must be encrypted or secure.

Encryption and/or decryption, however, requires an encryption key, which requires a secure distribution channel. Accordingly, there is a need for a system, apparatus and/or method to securely distribute and maintain encryption keys to establish secure communication between vehicles, infrastructure and/or other devices.

SUMMARY

In general, one aspect of the subject matter described in this specification is embodied in an encryption key distribution system. The encryption key distribution system includes multiple computing devices. The multiple computing devices include a first computing device coupled to a vehicle, a second computing device and a third computing device. The first computing device includes a memory configured to store a first distributed ledger. The first computing device includes a sensor configured to detect a distance between the vehicle and the second computing device. The first computing device includes a communication unit configured to communicate with the second computing device and the third computing device. The first computing device includes an electronic control unit coupled to the sensor and the communication unit. The electronic control unit is configured to provide the first distributed ledger to the second computing device when the distance is less than a threshold distance. The electronic control unit is configured to receive a second distributed ledger from the second computing device. The electronic control unit is configured to verify the second computing device using the second distributed ledger. The electronic control unit is configured to receive an encryption key from the third computing device after the second computing device has been verified.

These and other embodiments may optionally include one or more of the following features. The encryption key distribution system may include an external database. The external database may be configured to validate, verify or authenticate one or more identifiers including at least one of a vehicle identifier or a device identifier. The electronic control unit may be configured to identify or determine a second identifier from the second distributed ledger. The electronic control unit may provide an authentication request that may include the second identifier to the external database. The electronic control unit may be configured to receive an authentication that the second identifier is valid.

The second computing device may be coupled to the traffic infrastructure. The second computing device may include a processor. The processor may be configured to receive the first distributed ledger. The processor may be configured to identify or determine a first identifier from the first distributed ledger. The processor may be configured to provide an authentication request that includes the first identifier to the external database. The processor may be configured to receive an authentication that the first identifier is valid. The second computing device may be coupled to a traffic infrastructure or other vehicle infrastructure. The first distributed ledger and the second distributed ledger may each be represented by a blockchain that is formed from multiple blocks. Each block of the multiple blocks may be associated with a record.

The electronic control unit may be configured to provide a first encryption key request that may include a first identifier to the third computing device. The processor may be configured to provide a second key encryption key request that may include a second identifier to the third computing device.

The third computing device may include a memory and a processor. The memory may be configured to store multiple encryption keys. The third computing device may be coupled to the memory and may be configured to receive a first encryption key request that includes a first identifier and a second encryption key request that includes a second identifier. The processor may be configured to associate the first identifier and the second identifier with an encryption key of the multiple encryption keys. The processor may be configured to generate a record on a third distributed ledger with the association and may provide the encryption key to the first computing device and the second computing device.

In another aspect, the subject matter is embodied in a method for distributing encryption keys. The method includes detecting, by a first sensor of a vehicle, that the vehicle is within a threshold distance of an infrastructure. The method includes providing, by an electronic control unit of a vehicle and to a first processor of the infrastructure, a first distributed ledger associated with the vehicle. The method includes providing, by the first processor to the electronic control unit, a second distributed ledger associated with the infrastructure. The method includes verifying or authenticating, by the electronic control unit, the infrastructure using the second distributed ledger. The method includes verifying or authenticating, by the first processor, the vehicle using the first distributed ledger. The method includes obtaining, by the first processor and the electronic control unit from a second processor, an encryption key after the traffic infrastructure and the vehicle have been verified or authenticated. The method includes securely communicating between the vehicle and the traffic infrastructure using the encryption key.

In another aspect, the subject matter is embodied in a key distribution system. The key distribution system includes multiple computing devices including a first computing device coupled to a vehicle, a second computing device and a third computing device. The first computing device includes a memory configured to store a first distributed ledger. The first computing device includes a communication unit configured to communicate with the second computing device and the third computing device. The first computing device includes an electronic control unit coupled to the sensor and the communication unit. The electronic control unit is configured to provide the first distributed ledger to the second computing device. The electronic control unit is configured to receive the second distributed ledger from the second computing device. The electronic control unit is configured to verify the second computing device and receive an encryption key from a third computing device. The electronic control unit is configured to communicate with the second computing device using the encryption key.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views.

DETAILED DESCRIPTION

Disclosed herein are systems, devices, apparatuses and methods for accurately recording and immutably maintaining and distributing encryption keys to multiple entities to provide secure communication among the multiple entities. The encryption key distribution system ("key distribution system") identifies or otherwise determines when a vehicle is in proximity to another vehicle, infrastructure or other device or entity, authenticates the two entities, and distributes encryption keys to the authenticated entities to establish secure communication between the two entities. The key distribution system maintains a record of the transaction on the distributed ledger, which allows the key distribution system to maintain an immutable and more accurate record of the distribution of one or more encryption keys.

Other benefits and advantages include the capability to establish the secure communication between the different entities without the need to pre-load encryption keys. The key distribution system may deliver the encryption keys on-demand and/or on-the-fly when the vehicle or other entity attempts to securely communicate with another vehicle, infrastructure, device or other entity.

Figure 1:
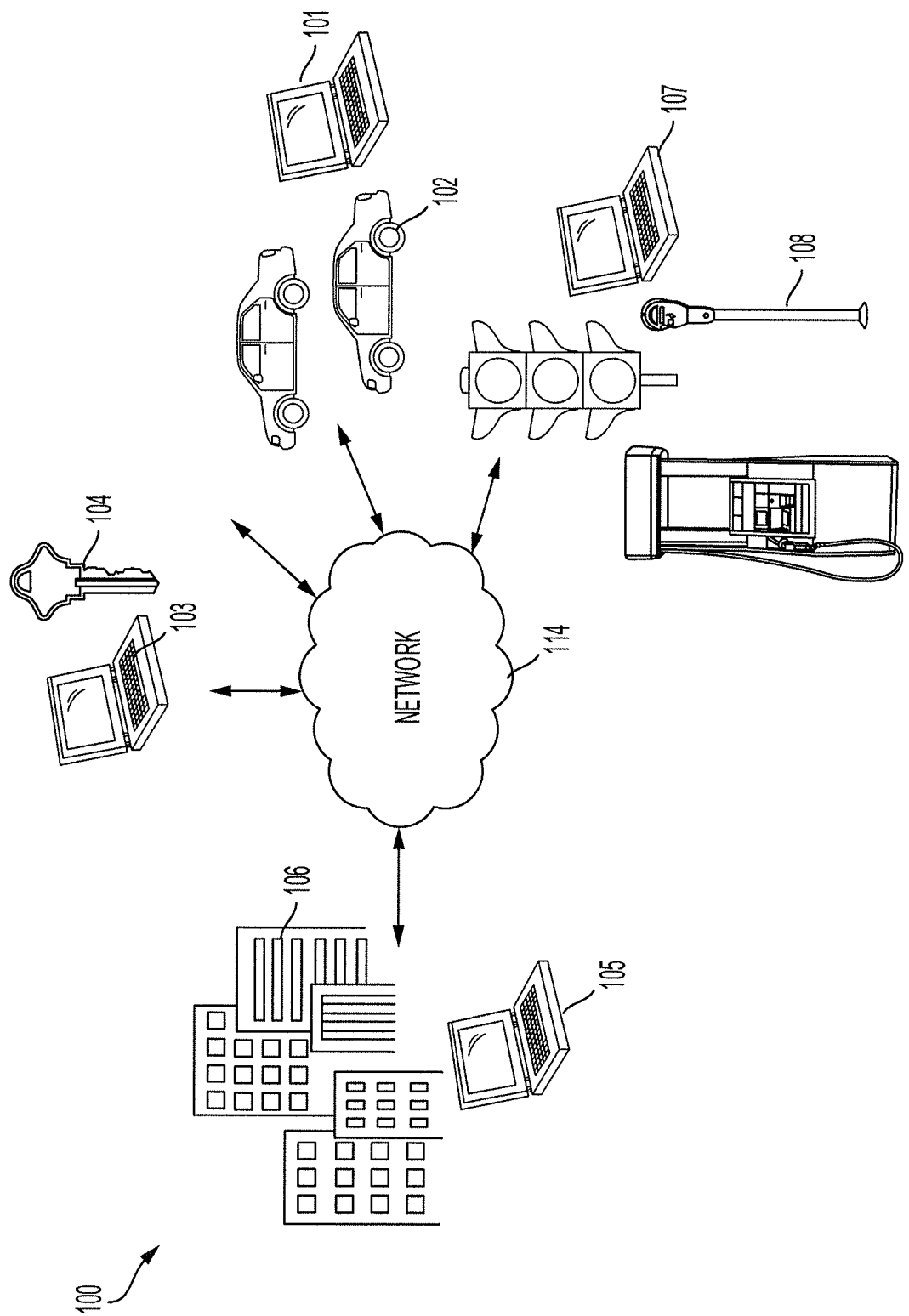
FIG. 1 is a block diagram of an example encryption key distribution system that uses one or more distributed ledgers to record vehicle interactions, other device interactions and distribute encryption keys according to an aspect of the invention.

FIG. 1 is a block diagram showing the encryption key distribution system ("key distribution system") 100 having one or more distributed ledgers (e.g., blockchains) implemented using multiple computing apparatuses (or "computing devices") 101, 103, 105, 107 associated with various entities, such as one or more vehicle entities (or "vehicle") 102, one or more key distribution entities 104, one or more authentication entities 106, and/or one or more other devices, such as one or more infrastructure entities (or "infrastructure") 108 or other device entities. Hereinafter, other infrastructure entities 108 or other device entities may be referred to as the infrastructure 108. A distributed ledger may be represented on a blockchain. The use of storing a record on a distributed ledger allows for other entities to check, verify, and/or validate the record placed on the distributed ledger. Moreover, the distributed ledger functions as an immutable record of the recorded information. The immutable record prevents others from tampering with, modifying or deleting any of the records on the distributed ledger.

The computing devices 101, 103, 105, 107 of the various entities may be represented as a node within the blockchain topology. Each entity may have its own distributed ledger represented as a blockchain and each record on the blockchain may be represented as a block. The various entities may add to the one or more distributed ledgers to update the one or more distributed ledgers with any updates or modifications. These entities may view, obtain, and/or add to the one or more distributed ledgers to receive or provide real-time accurate information from or to the other entities.

The one or more key distribution entities 104 may include a key distribution entity, such as a key distribution database or a certification or signature authority. The one or more key distribution entities 104 may utilize a computing device 103. The one or more key distribution entities 104 may receive one or more identifiers from one or more of the other entities, such as the vehicle 102 and/or the infrastructure 108. The one or more key distribution entities 103 may associate the identifiers of the one or more other entities with an encryption key that is distributed or otherwise provided to the one or more other entities and generate a record that includes the association among the identifiers and the encryption key to place on a distributed ledger. The distributed ledger of the one or more key distribution entities 104 may track and maintain the different keys generated and provided to the various other entities using a smart contract to negotiate the verification of the two entities and facilitate the distribution or delivery of the encryption key. This keeps an immutable record of the distribution of the various encryption keys and may allow for a certification or signature authority to verify that encryption keys are properly distributed to appropriate entities.

The one or more authentication entities 106 may include a transportation database or system or other external database or system that performs the function of a vehicle, infrastructure and/or device authentication server. The one or more authentication entities 106 may utilize a computing device 105. The one or more authentication entities 106 may authenticate or verify the identity of another entity, such as the vehicle 102, the infrastructure 108 or other device. For example, the one or more authentication entities 106 may receive an authentication request of a parking meter, a gas pump or other infrastructure 108. The authentication request may include a device identifier that identifies the parking meter, the gas pump or other infrastructure 108 and a location. If the location is associated with the location of the infrastructure 108 that is identified by the device identifier, the one or more authentication entities 106 may authenticate the infrastructure 108 and allow communication with the infrastructure 108.

The one or more infrastructure entities 108 may include one or more traffic signals, one or more parking meters, one or more gas pumps or other infrastructure entities or devices. The one or more infrastructure entities 108 may utilize a computing device 107. The one or more infrastructure entities 108 may communicate with a vehicle 102 when the vehicle 102 is within a threshold distance of the infrastructure 108. The one or more infrastructure entities 108 may maintain a distributed ledger that contains a history or record of the different vehicles that come in proximity to the infrastructure entity 108 and successfully establish a secure connection to communicate with the infrastructure entity 108. For example, the one or more infrastructure entities 108 may establish the secure connection to receive payment for gas pumped or payment for parking in a parking spot near or otherwise associated with the infrastructure entity 108. The one or more infrastructure entities 108 may obtain an encryption key from the key distribution entity to establish the secure connection and/or use the authentication entity 106 to authenticate the vehicle 102.

The one or more vehicle entities 102 may include one or more vehicles including a vehicle 102 and/or multiple vehicles. The one or more vehicle entities 102 may utilize a computing apparatus 101 such as a controller, an electronic control unit, or a processor. The one or more vehicle entities 102 may maintain a distributed ledger that records the different infrastructure 108 in which the vehicle 102 has successfully established a secure connection and/or the location of where the successful connection was established.

A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor or battery driven or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator 314. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors 214 and/or a navigation unit 320 to drive autonomously.

The key distribution system 100 maintains the one or more distributed ledgers using the one or more computing devices for each of the multiple entities. The computing devices may be included within, embedded within, retrofitted to or otherwise connected or coupled to the one or more entities. The key distribution system 100 includes computing devices integrated, included, retro-fitted or otherwise connected or coupled to the vehicle 102, the infrastructure 108 or other devices.

Figure 2:
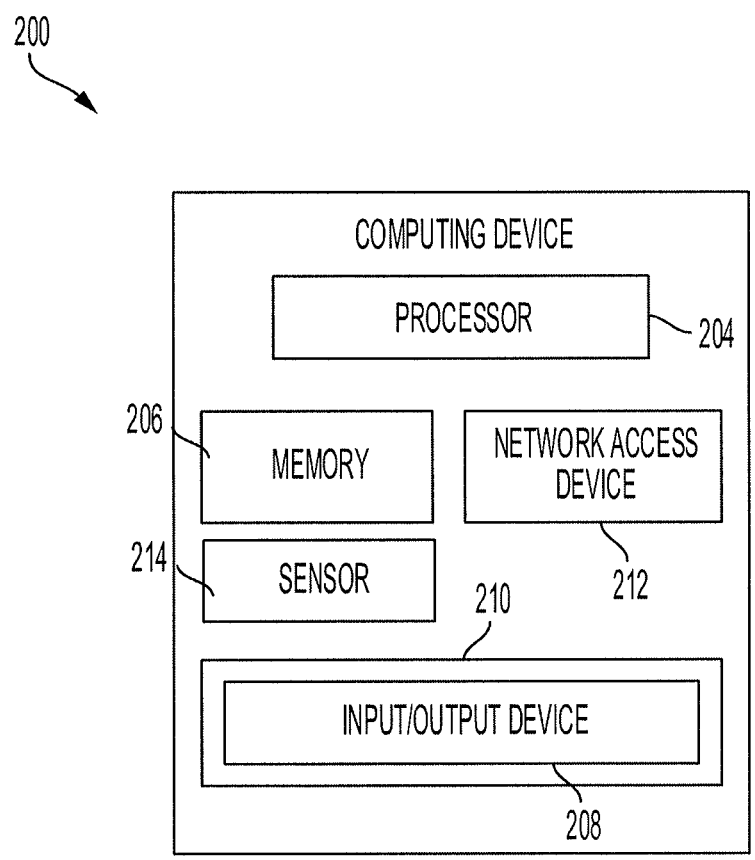
FIG. 2 is a block diagram of an example computing device of the encryption key distribution system of FIG. 1 according to an aspect of the invention.
Figure 3:
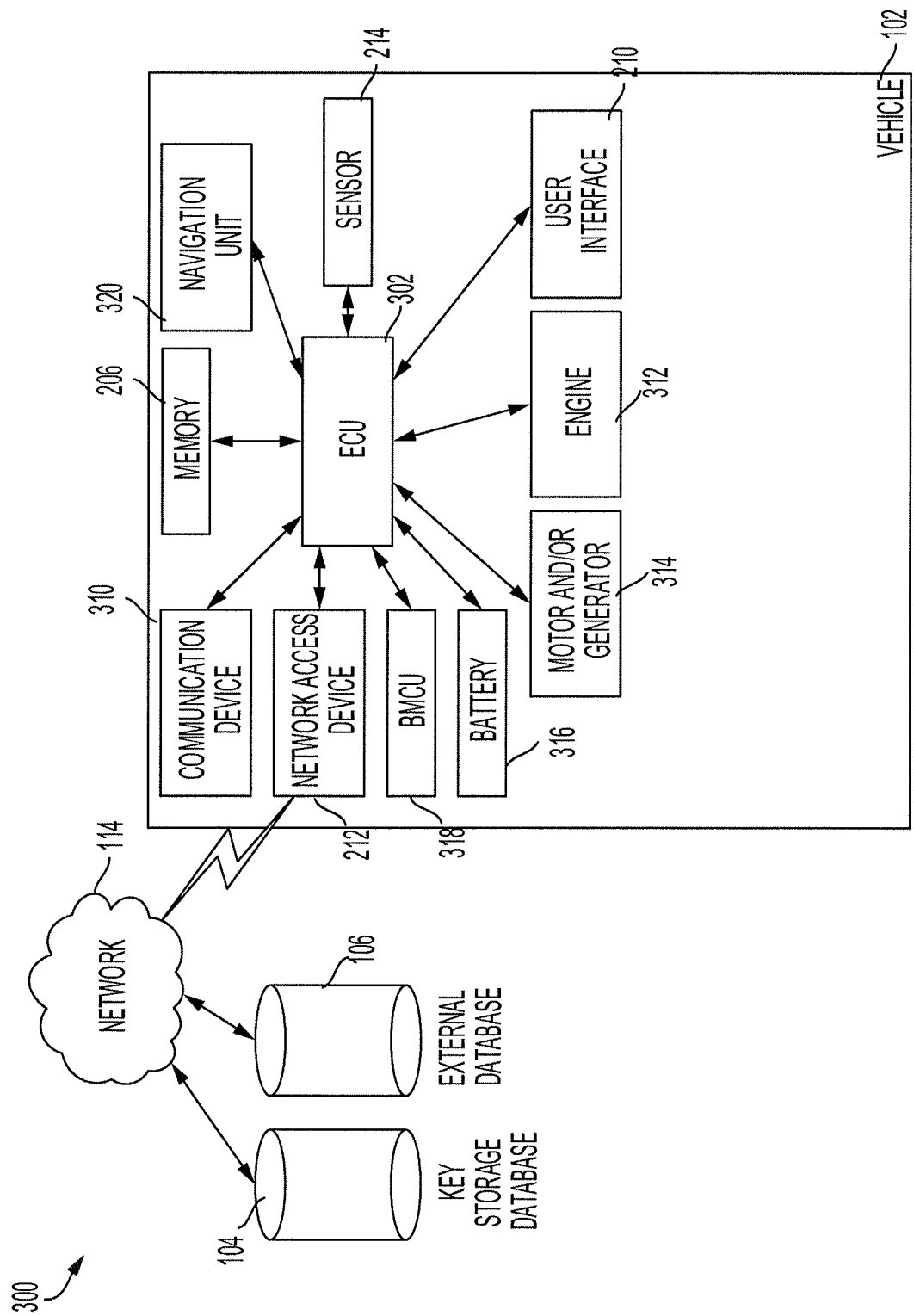
FIG. 3 is a block diagram of an example vehicle entity of the encryption key distribution system of FIG. 1 according to an aspect of the invention.

FIG. 2 is a block diagram of the one or more computing devices 101, 103, 105, 107 (hereinafter referred to as "computing devices"). The computing devices 101, 103, 105, 107 include a processor 204, such as an electronic control unit (ECU) 302, and a memory 206. The computing devices 101, 103, 105, 107 may include a user interface 210, one or more sensors 214, a communication device 310 and/or a network access device 212, and may be retrofitted, included within or otherwise connected or coupled to a corresponding entity that provides other components. For example, the computing device 101 may be connected to the vehicle 102. The vehicle 102 may include one or more other components, such as an engine 312, a motor and/or generator 314, a battery 316, a battery management and control unit (BMCU) 318 and/or a navigation unit 320, as shown in FIG. 3, for example.

The computing devices 101, 103, 105, 107 include one or more processors 204, such as an electronic control unit (ECU) 302. The one or more processors 204 or the ECU 302 may be implemented as a single processor or ECU or as multiple processors or ECUs, respectively. The ECU 302 may be electrically coupled to some or all of the components of the vehicle 102. The one or more processors 204 or controllers are designed for interacting with one or more distributed ledgers, such as reading, viewing, and/or adding a block to the blockchain, and/or obtaining data from the one or more sensors 214.

For example, the ECU 302 may interact with the other ECUs of other surrounding vehicles, other surrounding infrastructure 108 and/or another device. The ECU 302 may generate, use and/or modify a distributed ledger for the vehicle 102 that tracks successful connections between the vehicle 102 and the other infrastructure 108 or device. A record on the distributed ledger for the vehicle 102 associates the vehicle 102 with other infrastructure 108 or device that the vehicle 102 may securely connect or establish a connection with.

In another example, the processor 204 of the computing device 107, which is associated with the infrastructure 108, may interact with the vehicle 102. The processor 204 of the computing device 107 may generate, use and/or modify a distributed ledger for the infrastructure 108 that tracks a successful connection between vehicles that are within a threshold distance of the infrastructure 108. A record on the distributed ledger for the infrastructure 108 associates the vehicle 102 with the infrastructure 108 when a secure connection is attempted and/or established. The vehicle and/or infrastructure may use the distributed ledgers to authenticate the other entity.

In another example, the processor 204 of the computing device 103, which is associated with the key distribution entity 104, may interact with the vehicle 102 and/or the infrastructure 108. The processor 204 of the computing device 103 may generate, distribute and/or otherwise provide an encryption key to the vehicle 102 and/or the infrastructure 108 after the vehicle 102 and the infrastructure 108 are authenticated. A record on the distributed ledger for the key distribution entity 104 associates the vehicle 102, the infrastructure 108 and the provided encryption key to the vehicle 102 and the infrastructure 108 to allow for secure communication between the vehicle 102 and the infrastructure 108.

The memory 206 may be coupled to the one or more processors 204 or the ECU 302 and store instructions that the one or more processors 204 or the ECU 302 executes, respectively. The memory 206 may include one or more of a Random Access Memory (RAM) or other volatile or non-volatile memory. The memory 206 may be a nontransitory memory or a data storage device, such as a hard disk drive, a solid-state disk drive, a hybrid disk drive, or other appropriate data storage, and may further store machine-readable instructions, which may be loaded and executed by the one or more processors 204 or ECUs 302. The memory 206 may store the one or more distributed ledgers associated with the different entities, such as the vehicle history ledger, the infrastructure history ledger and/or the key distribution history ledger.

The computing devices 101, 103, 105, 107 may include a user interface 210. The user interface 210 may include an input/output device 208 capable of receiving user input, such as a user interface element, a button, a dial, a microphone, a keyboard, or a touch screen, and any device capable of output, such as a display, a speaker, or a refreshable braille display. The user interface 210 may display one or more notifications or a record associated with the distributed ledger. The record may have a history of the different vehicles that have successfully communicated and utilized the infrastructure 108 or a history of the various infrastructure that the vehicle 102 has successfully communicated with and/or utilized, for example.

The computing devices 101, 103, 105, 107 may include a network access device 212. The network access device 212 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access device 212 may transmit data to and receive data from devices and systems not directly connected to the computing devices 101, 103, 105, 107 via a network 114. The network 114, such as a local area network (LAN), a wide area network (WAN), a cellular network, the Internet, or combination thereof, various computing devices of the multiple entities. One or more of the computing devices 101, 103, 105, 107 may be integrated within an entity, such as the computing device 101, which may be retro-fitted, integrated, included or otherwise connected or coupled to the vehicle 102. The various computing devices 101, 103, 105, 107 store a history of vehicle and/or infrastructure communication connections and/or the encrypted key within a distributed ledger on a blockchain, for example.

FIG. 3 shows a block diagram of the computing device 101 within the vehicle 102. The computing device 101 may include or be coupled to one or more other components. The one or more other components may be part of the vehicle 102. The one or more other components may include one or more sensors 214, a communication device 310 and/or a navigation unit 320.

The one or more sensors 214 may include a proximity sensor. The proximity sensor may be positioned or otherwise coupled to the vehicle 102, the infrastructure 108 or another device. The proximity sensor may detect one or more surrounding objects, such as another vehicle or infrastructure 108 or other device, and may measure, detect or otherwise determine a relative distance between the proximity sensor and the one or more surrounding objects.

In some implementations, the one or more sensors 214 may include a camera. The camera may capture image data of the one or more surrounding objects. One of the processors 204 of the computing devices 101, 103, 105, 107 may determine the relative distance between the camera and the other surround object, such as another vehicle or infrastructure 108 or other device, within the image data. The processors 204 may use the image data to verify or authenticate objects within the image, such as a vehicle 102.

The computing device 101 may include or be coupled to a communication device 310. The communication device 310 may be an application that runs on the computing device 101 to communicate with a server or other remote device. The communication device 310 may use Vehicle-to-Vehicle (V2V) or Vehicle-to-Infrastructure (V2I) communication to communicate between the vehicle 102 and other vehicles and/or infrastructure 108. In some implementations, the computing device 101 may be coupled to a communication device 310, such as a smart phone or a mobile device of an occupant, to use the functions of the communication device 310, such as a global positioning satellite device, to initiate communication with other infrastructure 108, authenticate the infrastructure 108 or obtain an encryption key from a key distribution entity 104.

The computing device 101 may be coupled to one or more vehicle components of the vehicle 102. The one or more vehicle components may include an engine 312, a motor and/or generator 314, a battery 316 and/or a battery management and control unit (BMCU) 318.

The motor and/or generator 314 may be an electric motor and an electric generator that converts electrical energy into mechanical power, such as torque, and converts mechanical power into electrical energy. The motor and/or generator 314 may be coupled to the battery 316. The motor and/or generator 314 may convert the energy from the battery 316 into mechanical power, and may provide energy back to the battery 316, for example, via regenerative braking. In some implementations, the vehicle 102 may include one or more additional power generation devices such as the engine 312 or a hydrogen fuel cell stack (not shown). The engine 312 combusts fuel to provide power instead of and/or in addition to the power supplied by the motor and/or generator 314. In an embodiment with a hydrogen fuel cell stack, hydrogen is processed by the stack to supply power to the motor and/or generator 314.

The battery 316 may be coupled to the motor and/or generator 314 and may provide electrical energy to and receive electrical energy from the motor and/or generator 314. The battery 316 may include one or more rechargeable batteries.

The battery management and control unit (BMCU) 318 may be coupled to the battery 316 and control and manage the charging and discharging of the battery 316. The BMCU 318, for example, may measure, using the battery sensor, parameters used to determine the state of charge (SOC) of the battery 316.

The one or more vehicle components may include a navigation unit 320 that obtains navigational map information and/or vehicle information to autonomously navigate the vehicle 102 and/or display a route to the user through the user interface 210. The navigational map information may include a map that identifies roadways, terrains and other points of interest to navigate the vehicle 102. The navigational map information may include route information that includes a starting point, a destination point and a path of travel from the starting point to the destination point for the vehicle 102. The vehicle information may include a current location of the vehicle 102, a current direction of travel of the vehicle 102 and/or a current speed of the vehicle 102. In some implementations, the navigation unit 320 uses global positioning system (GPS) information to determine such information.

Figure 4:
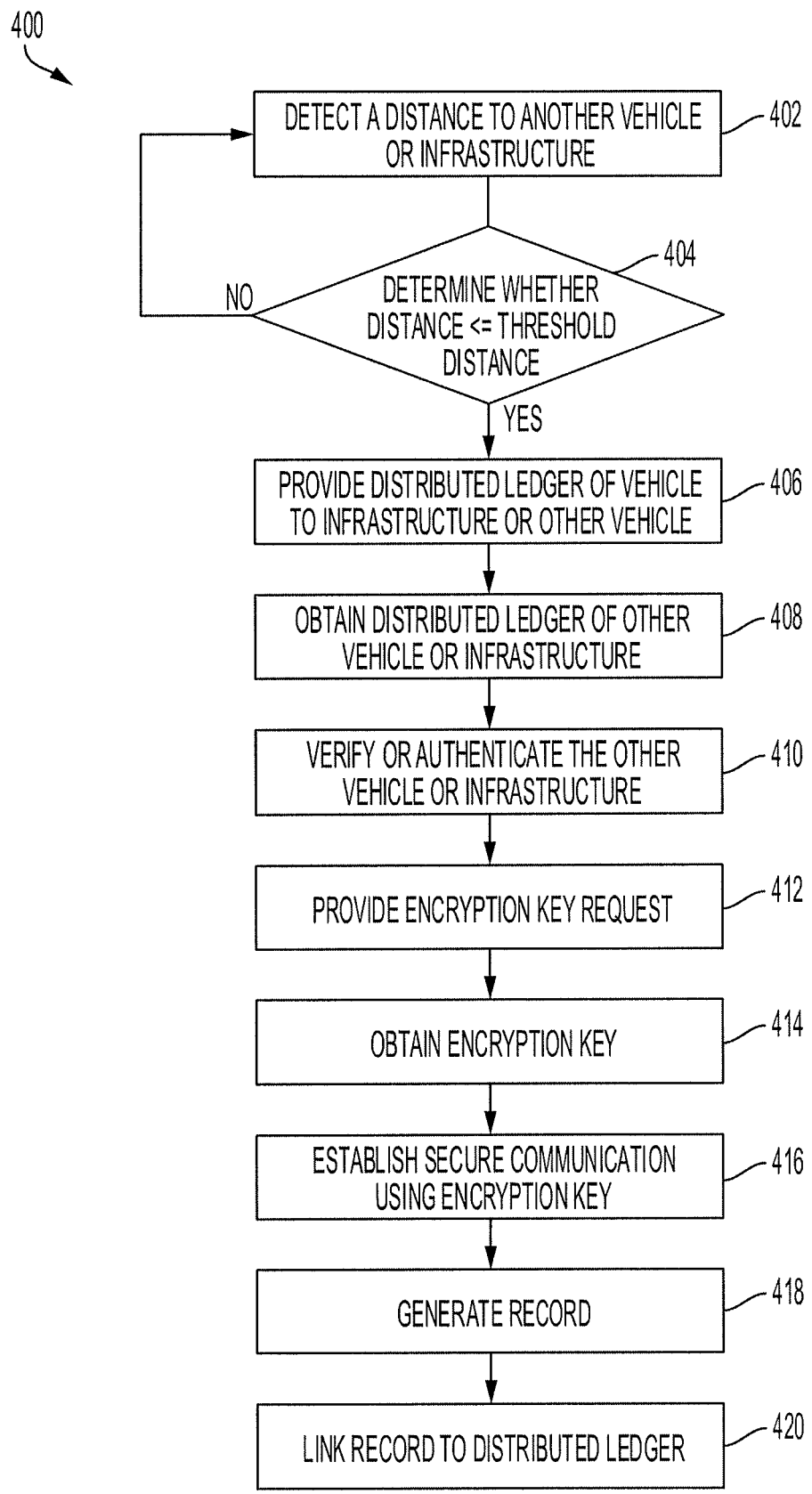
FIG. 4 is a flow diagram of an example process for obtaining an encryption key by an entity using the encryption key distribution system of FIG. 1 according to an aspect of the invention.

FIG. 4 is a flow diagram of a process 400 for obtaining an encryption key by an entity and establishing secure communication with another entity. One or more computers or data processing apparatuses, for example, the ECU 302 of the computing device 101 and/or the processor 204 of the computing device 107 of the key distribution system 100 of FIG. 1, appropriately programmed, may implement and execute the process 400. The vehicle 102, the infrastructure 108 or a combination of both may implement the functionality, as described below in FIG. 4.

The key distribution system 100 detects a relative distance between the vehicle 102 and the other vehicle, infrastructure 108 or device (402). The computing device 101 of the vehicle 102 may use a proximity sensor to detect the distance between the vehicle 102 and the other vehicle, infrastructure 108 or device. For example, the proximity sensor may use radar, LIDAR, ultrasound, BLE RSSI, camera or other device to determine the relative distance between the vehicle 102 and the other vehicle, infrastructure 108 or device. The computing device 107 of the infrastructure 108 may also detect a distance between the vehicle 102 and the infrastructure 108. In another example, the infrastructure 108 may use a camera to capture image data and determine the relative distance between the vehicle 102 and the infrastructure 108 using the image data. In some embodiments, directional data (e.g., triangulation, direction finding, etc.) may be used to determine the relative direction of the other vehicle, infrastructure 108 or device from the vehicle 102 to narrow the target infrastructure 108 or device when multiple infrastructure 108 or devices are within the proximity.

Once the relative distance is detected, the computing device 101, 103, 105, 107 of the key distribution system 100 may compare the relative distance to a threshold distance and determine whether the relative distance is less than the threshold distance (404). If the relative distance is greater than the threshold distance, the key distribution system 100 may keep monitoring the distance between the vehicle 102 and other vehicles, infrastructure 108 or other device until the key distribution system 100 detects another vehicle, infrastructure 108 or other device within the threshold distance. If the relative distance is less than the threshold distance, each entity, e.g., the vehicle 102 or the infrastructure 108, may attempt to authenticate the other entity, e.g., the infrastructure 108 or the vehicle 102, respectively, and provide a distributed ledger of a history of their interactions with other devices to the other entity.

When the vehicle 102 is in proximity to the infrastructure 108, i.e., within a threshold distance, the vehicle 102 and the infrastructure 108 exchange and/or provide each other their associated distributed ledgers (406). The vehicle 102 provides a distributed ledger associated with the vehicle 102 (or "vehicle history ledger") to the infrastructure 108, and the infrastructure 108 provides a distributed ledger associated with the infrastructure 108 (or "infrastructure history ledger") to the vehicle 102. The vehicle 102 and the other vehicle or infrastructure 108 may exchange the distributed ledgers across proximity communication, such as BLE, V2V, V2I, or other wireless communication, prior to establishing a secure connection.

The vehicle history ledger includes a vehicle identifier, such as a vehicle identification number (VIN), which is unique to the vehicle 102, and the infrastructure history ledger includes an infrastructure or device identifier ("device identifier"), which is unique to the infrastructure. The vehicle history ledger maintains a history of the different interactions between the vehicle 102 and other devices, such as the infrastructure 108. Each record within the vehicle history ledger may describe a time, a location, a device identifier and/or a type of device that the vehicle 102 attempted to connect with and whether the vehicle 102 was able to successfully connect to the device. Other information including a type of transaction, such as payment for gas or for parking, during the established communication may be included in the record. For example, a record may indicate that the vehicle 102 was in proximity to a parking meter on Main Street on Saturday, Jan. 4, 2019 at 5 p.m. ET and successfully connected with the parking meter to pay for parking a one hour. On the other hand, the infrastructure history ledger includes an infrastructure or device identifier and describes a time, a location, a type of device that the infrastructure 108 attempted to connect with and whether the infrastructure 108 was able to successfully connect to the device. Other information that may be included in the record include a description of a type of transaction, such as a payment, that occurred during the established communication or an image of the connecting device, such as the vehicle 102, or other information regarding the connecting device, such as a license plate number or other identifier.

The vehicle 102 obtains the infrastructure history ledger including the device identifier from the infrastructure 108, and the infrastructure 108 obtains the vehicle history ledger including the vehicle identifier from the vehicle 102 (408). The vehicle 102 and the infrastructure 108 or other vehicle or device may exchange the distributed ledgers including the history of the vehicle 102 and/or the infrastructure 108 or other vehicle across proximity communication using the communication device 310 and/or the network access device 212 via the network 114.

The key distribution system 100 authenticates the vehicle 102 and the infrastructure 108 using the infrastructure history ledger or the vehicle history ledger, respectively (410). The use of the authentication entity 106 to authenticate the vehicle 102 and the infrastructure 108 prevents a malicious attacker from spoofing the identify of either the vehicle 102 or another vehicle, infrastructure 108 or other device.

The electronic control unit 302 may extract the device identifier from the infrastructure history ledger and send an authentication request that includes the device identifier to the authentication entity 106 over the network 114, for example. The authentication request may also include additional information, such as the location of the vehicle 102 or a history of other devices that the infrastructure 108 had previously and successfully communicated with, which may be used by the authentication entity 106 to authenticate the infrastructure 108. The authentication entity 106 may compare the location of the vehicle 102 with a list of known infrastructures within or near the location of the vehicle 102 and authenticate the infrastructure 108 if the infrastructure 108 is known to be within the location of the vehicle 102.

The processor 204 of the computing device 107 may, similarly, extract the vehicle identifier from the vehicle history ledger and send an authentication request that includes the vehicle identifier to the authentication entity 106 over the network 114, for example. The authentication request may also include information, such as image data captured by a camera, or other identifying information of the connecting vehicle 102, which may be extracted from the image data, such as a license plate number. The authentication entity 106 may cross-reference the vehicle identifier with the license plate number to verify that the vehicle identifier and the license plate number are for the same vehicle. The authentication entity 106 may authenticate the vehicle 102 if the vehicle identifier and the license plate number match.

In some implementations, the authentication entity 106 may select one or more records from the infrastructure history ledger, identify a vehicle that previously connected with the infrastructure 108, contact the vehicle and verify that the vehicle 102 successfully authenticated the infrastructure 108 to authenticate the infrastructure 108. Similarly, in some implementations, the authentication entity 106 may select one or more records from the vehicle history ledger, identify an infrastructure 108 or other device that previously connected with the vehicle 102 and verify that the infrastructure 108 successfully authenticated the vehicle 102 to authenticate the vehicle 102.

Once both the vehicle 102 and the other vehicle or infrastructure 108 are authenticated, the vehicle 102 and the infrastructure 108 may each send or otherwise provide an encryption key request that includes the vehicle identifier and device identifier, respectively, to the key distribution entity 104 (412). The vehicle 102 and the infrastructure 108 may each send an encryption key request to the key distribution entity 104. The encryption key request may include the vehicle identifier and the device identifier so that the encryption key request indicates a connection is to be established between the vehicle 102 associated with the vehicle identifier and the infrastructure 108 associated with the device identifier. The encryption key request may request for an encryption key to establish the secure communication between the vehicle 102 and the infrastructure 108. In some implementations, the encryption key request may request a specific type of encryption key.

Each of the encryption key requests sent from the vehicle 102 and the infrastructure 108 may need to indicate the identifiers of the two authenticated parties to be connected so that the key distribution entity 104 provides the same encryption key to both entities. The encryption key request may be sent or provided via the network 114 using the network access device 212 or communication device 310.

Figure 5:
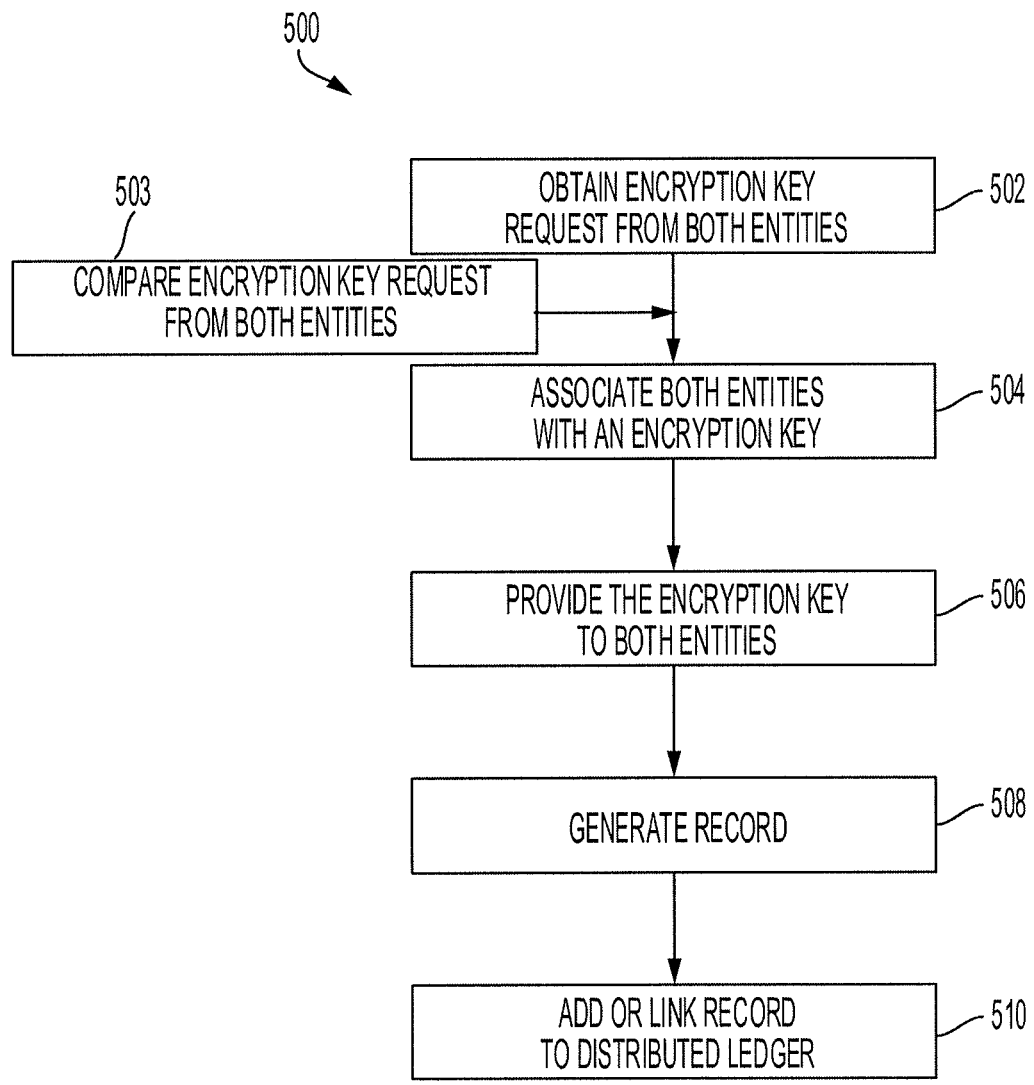
FIG. 5 is a flow diagram of an example process for providing the encryption key to an entity using the encryption key distribution system of FIG. 1 according to an aspect of the invention.

The vehicle 102 and the infrastructure 108 both obtain an encryption key from the key distribution entity 104 once the key distribution entity 104 has verified and processed the encryption key request (414). The encryption keys may be obtained over-the-air via the network 114. FIG. 5 further describes the process of distributing and providing the encryption keys by the key distribution entity 104.

Once the encryption key is obtained by both the vehicle 102 and the infrastructure 108 or other device, the vehicle 102 and the infrastructure 108 establish a secure communication channel between the vehicle 102 and the infrastructure 108 using the encryption key (416). The vehicle 102 and the infrastructure 108 establish a handshaking protocol and encrypt communication between the vehicle 102 and the infrastructure 108, which allows the two entities to communicate securely. Moreover, the encryption of the communication between the two entities protects the confidentiality of the message or data exchanged during the communication session. This allows the two entities to exchange sensitive information, such as payment information, without fear of interception, modification or other unauthorized or unintentional access by another party or entity.

After the communication is attempted, the vehicle 102 generates a record to add to the vehicle history ledger that indicates the transaction with the infrastructure 108, and similarly, the infrastructure 108 generates a record to add to the infrastructure history ledger (418). The records may indicate the devices that were attempting to connect, a description of any transactions occurring during the established communication, a successful or unsuccessful authentication of the other device and/or an indication of whether an encryption key was received to establish the communication. The key distribution system 100 then adds or links the record to the vehicle history ledger for the vehicle 102 and the infrastructure history ledger of the infrastructure 108 (420).

FIG. 5 is a flow diagram of a process 500 for distributing or otherwise providing the encryption key to the vehicle 102 and/or the infrastructure 108 using the key distribution entity 104 of the key distribution system 100 of FIG. 1. One or more computers or data processing apparatuses, for example, the processor 204 of the computing device 103 of the key distribution system of FIG. 1, appropriately programmed, may implement and execute the process 500. The key distribution entity 104, such as a key distribution database, may implement the functionality, as described below in FIG. 5.

The key distribution system 100 obtains an encryption key request from both entities, such as the vehicle 102 and/or the infrastructure 108 or other device (502). The key distribution system 100, such as the key distribution entity 104, may receive the encryption key request separately from both the vehicle 102 and/or the infrastructure 108. The encryption key request may include a request for an encryption key and the identifiers of the two devices, such as the vehicle 102 and the infrastructure 108, attempting to establish a connection. The key distribution entity 104 may require that the two entities each send an encryption key request that includes the identifiers of the two devices and the request for an encryption key within a threshold period of time, such as approximately within 10 seconds, before providing the encryption key.

The key distribution system 100 may compare the two encryption key requests from the vehicle 102 and the infrastructure 108 and ensure that the two encryption key requests have the same information (503) within specific time duration of the two encryption key requests. That is, the key distribution system 100 may ensure that the two encryption key requests share the same connection information, such as the two identifiers of the two devices that are attempting to establish a secure connection.

When the two encryption key requests are obtained, the key distribution system 100 associates the entities, e.g., the identifiers of the vehicle 102 and the infrastructure 108, with an encryption key, which is to be used to establish a secure connection between the two entities (504). The key distribution system 100 provides the encryption key to both entities identified by the identifiers after the encryption key is associated with the entities (506). For example, if the encryption key request includes the vehicle identifier of the vehicle 102 and the device identifier of the infrastructure 108, the key distribution entity 104 may associate the encryption key to the vehicle 102 and provide the encryption key to the vehicle 102 and the infrastructure 108.

Once the key distribution system 100 associates the encryption key with the identifiers that are requesting the encryption key, the key distribution system 100 generates a record that identifies the two identifiers of the entities establishing the connection and the encryption key that is provided or to be provided (508). The key distribution system 100 adds or links the record to a key distribution history ledger maintained or stored on the computing device 103 (510). The key distribution history ledger is a history of identifiers, which have requested an encryption key to establish a connection, and the associated encryption key provided to the two identifiers to establish the connection. Thus, the key distribution history ledger maintains a history of records to track and maintain the identifiers that have requested an encryption key and the associated encryption key provided to the entities associated with the identifiers that establish a connection using the encryption key. The key distribution system 100 may disable or deactivate the encryption key when an activation timer expires or repeated requests or any other error case is detected.

Figure 6:
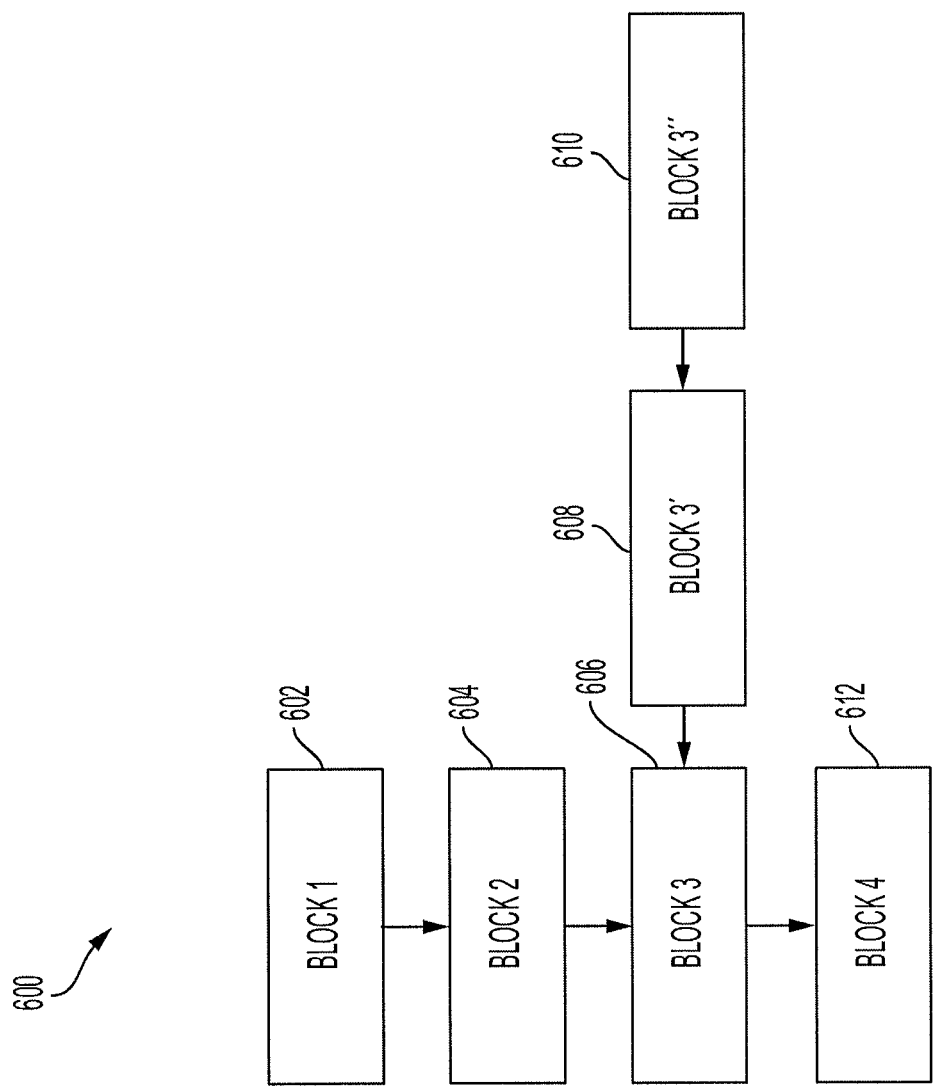
FIG. 6 is a block diagram of an example blockchain that represented a distributed ledger used by the encryption key distribution system of FIG. 1 according to an aspect of the invention.

FIG. 6 shows a distributed ledger represented as a blockchain 600 and corresponding records on the distributed ledger represented as blocks 602, 604, 606, 608, 610, 612 on the blockchain. The blocks 602, 604, 606, 608, 610, 612 each represents different records that are linked on the blockchain 600. The blocks 602, 604, 606, 608, 610, 612 may have been generated by different entities and/or the same entity. Each block is linked to another adjacent block. The blocks 608, 610 are linked to the block 606 to represent modifications and/or updates to the linked block 606. That is, the information in the new record represented by block 608 modifies and/or updates the information within the record represented by the block 606 may be linked to the block 606 using an identifier, such as a vehicle identifier or device identifier. Similarly, the information within the record represented by the block 610 modifies and/or updates the information within the record represented by the blocks 606, 608.

Where used throughout the specification and the claims, "at least one of A or B" includes "A" only, "B" only, or "A and B." Exemplary embodiments of the methods/systems have been disclosed in an illustrative style. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An encryption key distribution system, comprising:
   a plurality of computing devices including a first computing device coupled to a vehicle, a second computing device and a third computing device;
   wherein the first computing device includes:
   a memory configured to store a first distributed ledger;
   a sensor configured to detect a distance between the vehicle and the second computing device;
   a communication unit configured to communicate with the second computing device and the third computing device;
   an electronic control unit coupled to the sensor and the communication unit and configured to:
   provide the first distributed ledger to the second computing device when the distance is less than a threshold distance,
   receive a second distributed ledger from the second computing device,
   verify the second computing device using the second distributed ledger, and
   receive an encryption key from the third computing device after the second computing device has been verified.

2. The encryption key distribution system of claim 1, further comprising:
   an external database configured to validate, verify or authenticate one or more identifiers including at least one of a vehicle identifier or a device identifier.

3. The encryption key distribution system of claim 2, wherein to verify the second computing device, the electronic control unit is configured to:
   identify or determine a second identifier from the second distributed ledger;
   provide an authentication request that includes the second identifier to the external database; and
   receive an authentication that the second identifier is valid.

4. The encryption key distribution system of claim 3, wherein the second computing device is coupled to a traffic infrastructure and includes:
   a processor configured to:
   receive the first distributed ledger;
   identify or determine a first identifier from the first distributed ledger;
   provide an authentication request that includes the first identifier to the external database; and
   receive an authentication that the first identifier is valid.

5. The encryption key distribution system of claim 4, wherein the electronic control unit is further configured to provide a first encryption key request including the first identifier to the third computing device, wherein the processor is further configured to provide a second key encryption key request including the second identifier to the third computing device.

6. The encryption key distribution system of claim 1, wherein the third computing device includes:
   a memory configured to store a plurality of encryption keys; and
   a processor coupled to the memory and configured to:
   receive a first encryption key request including a first identifier and a second encryption key request including a second identifier,
   associate the first identifier and the second identifier with an encryption key of the plurality of encryption keys,
   generate a record on a third distributed ledger with the association, and
   provide the encryption key to the first computing device and the second computing device.

7. The encryption key distribution system of claim 1, wherein the second computing device is coupled to a traffic infrastructure or other vehicle infrastructure.

8. The encryption key distribution system of claim 1, wherein the first distributed ledger and the second distributed ledger are each represented by a blockchain that is formed from a plurality of blocks and each block of the plurality of blocks is associated with a record.

9. A method for distributing encryption keys, comprising:
   detecting, by a first sensor of a vehicle, that the vehicle is within a threshold distance of an infrastructure;
   providing, by an electronic control unit of the vehicle and to a first processor of the infrastructure, a first distributed ledger associated with the vehicle;
   providing, by the first processor to the electronic control unit, a second distributed ledger associated with the infrastructure;
   verifying or authenticating, by the electronic control unit, the infrastructure using the second distributed ledger;
   verifying or authenticating, by the first processor, the vehicle using the first distributed ledger;
   obtaining, by the first processor and the electronic control unit from a second processor, an encryption key after the infrastructure and the vehicle have been verified or authenticated; and
   securely communicating between the vehicle and the traffic infrastructure using the encryption key.

10. The method of claim 9, wherein verifying or authenticating, by the electronic control unit, the infrastructure using the second distributed ledger includes:

determining a second identifier from the second distributed ledger;
providing a first authentication request to an external database to verify or authenticate the infrastructure; and
receiving an authentication that the second identifier is valid.

11. The method of claim 10, wherein verifying or authenticating, by the first processor, the vehicle using the first distributed ledger includes:
determining a first identifier from the first distributed ledger;
providing a second authentication request to the external database to verify or authenticate the vehicle; and
receiving an authentication that the first identifier is valid.

12. The method of claim 9, further comprising:
receiving, by a second processor, an encryption key request including a first identifier and a second identifier;
associating the first identifier and the second identifier with an encryption key of a plurality of encryption keys;
storing the association in a record on a third distributed ledger; and
providing the encryption key to the electronic control unit and the first processor.

13. The method of claim 12, further comprising:
generating a first record that includes an association between the vehicle and the infrastructure to add or link to the first distribute ledger;
generating a second record that includes an association between the vehicle and the infrastructure to add or link to the second distributed ledger; and
adding or linking the first record to the first distributed ledger and the second record to the second distributed ledger.

14. The method of claim 13, wherein the record on the third distributed ledger indicates the encryption key provided along with the vehicle and the infrastructure where the encryption key was provided, wherein the second distributed ledger indicates the infrastructure and the vehicle which was authenticated by the infrastructure, wherein the first distributed ledger indicates the vehicle and the infrastructure which was authenticated by the vehicle.

15. The method of claim 9, wherein the first distributed ledger and the second distributed ledger are each represented by a blockchain that is formed from a plurality of blocks and each block of the plurality of blocks is associated with a record.

16. A key distribution system, comprising:
a plurality of computing devices including a first computing device coupled to a vehicle, a second computing device and a third computing device;
wherein the first computing device includes:
a memory configured to store a first distributed ledger;
a communication unit configured to communicate with the second computing device and the third computing device; and
an electronic control unit coupled to the sensor and the communication unit and configured to:
provide the first distributed ledger to the second computing device,
receive a second distributed ledger from the second computing device,
verify the second computing device using the second distributed ledger,
receive an encryption key from the third computing device after the second computing device has been verified, and
communicate with the second computing device using the encryption key;
wherein the third computing device includes:
a memory configured to store a plurality of encryption keys that includes the encryption key; and
a processor coupled to the memory and configured to:
receive a first encryption key request including a first identifier and a second encryption key request including a second identifier,
associate the first identifier and the second identifier with the encryption key,
generate a record on a third distributed ledger with the association, and
provide the encryption key to the first computing device and the second computing device.

17. The key distribution system of claim 16, wherein the first computing device includes:
a sensor configured to detect a distance between the vehicle and the second computing device;
wherein the electronic control unit is configured to provide the first distributed ledger to the second computing device when the distance is less than a threshold distance.

18. The key distribution system of claim 16, wherein the electronic control unit is configured to establish secure communication between the first computing device and the second computing device using the encryption key.

19. The key distribution system of claim 16, wherein the first distributed ledger and the second distributed ledger are each represented by a blockchain that is formed from a plurality of blocks and each block of the plurality of blocks is associated with a record.

* * * * *